Sept. 4, 1928.
W. G. KOHL
POULTRY RECORD CALENDAR
Filed Sept. 8, 1927
1,683,140
2 Sheets-Sheet 1
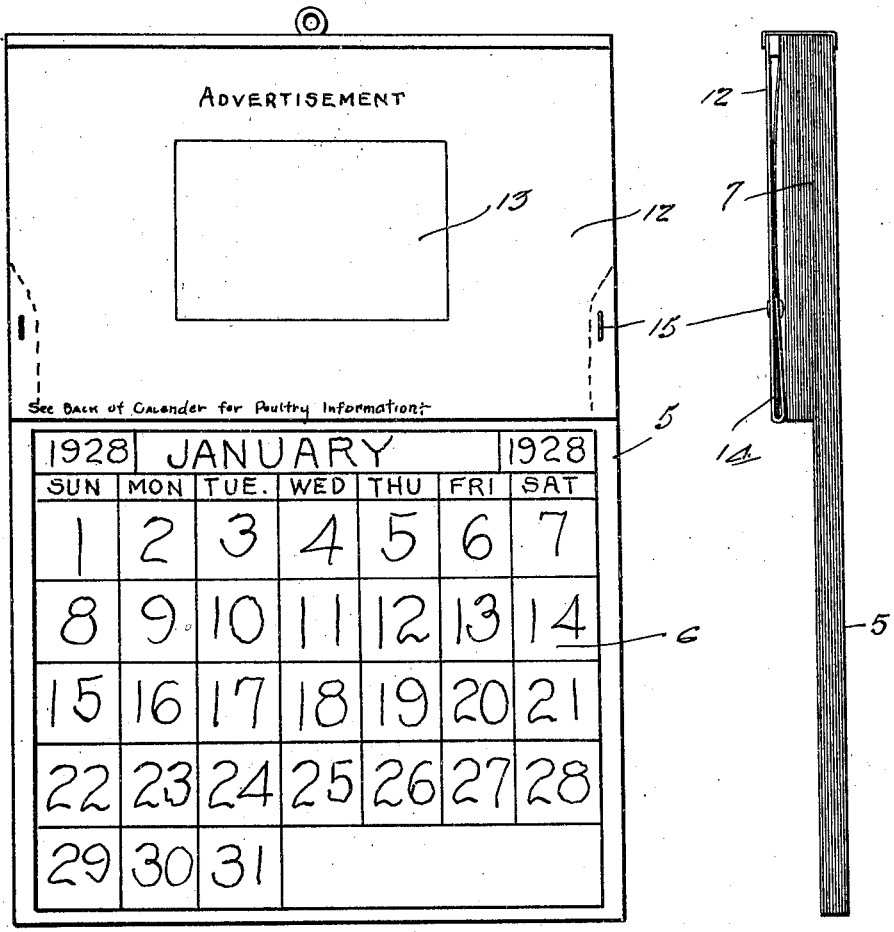

Sept. 4, 1928.
W. G. KOHL
1,683,140
POULTRY RECORD CALENDAR
Filed Sept. 8, 1927    2 Sheets-Sheet 2
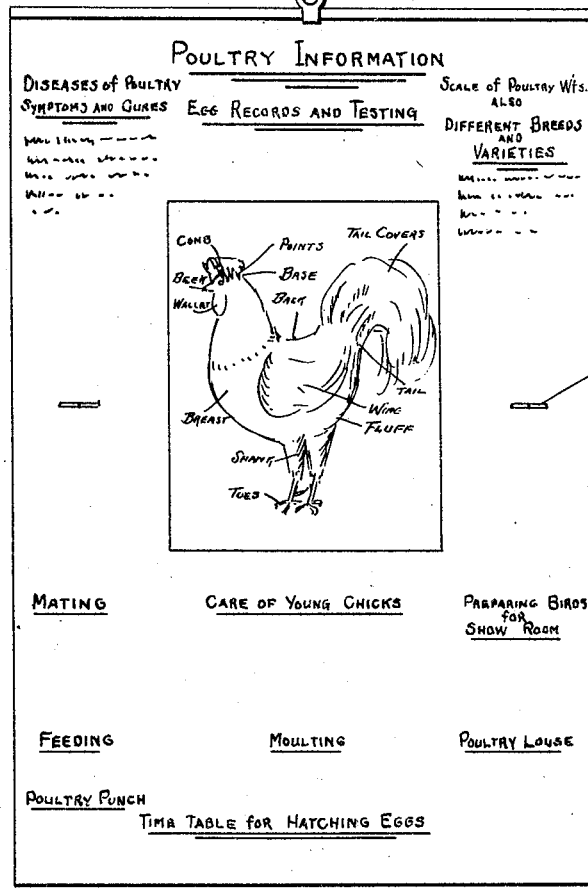

Patented Sept. 4, 1928.

1,683,140

UNITED STATES PATENT OFFICE.

WESLEY GEORGE KOHL, OF IOWA CITY, IOWA.

POULTRY-RECORD CALENDAR.

Application filed September 8, 1927. Serial No. 218,247.

This invention relates to calendars adapted particularly for use in connection with the keeping of a record of the expenses and production of a poultry business and comprises essentially a calendar mounting having a calendar pad arranged at the lower portion thereof with a pad of record sheets arranged at the upper portion thereof, the top sheet comprising a cover sheet upon which may be arranged suitable advertising matter or a suitable ornamental display, with the back thereof provided with a pocket within which to receive the lower end of the record sheet as the record is completed thereon, whereby to enable such sheets to be preserved in an out-of-the-way position during the compilation of a subsequent record sheet.

An object of the invention is to provide a poultry record calendar embodying a record sheet enabling a daily record of the amount of eggs produced to be kept, together with the total monthly expenses and sales and also enabling each monthly record sheet for the entire year to be kept in chronological order so that the results of the operation of the business for the entire year may be easily and quickly determined.

Other objects and advantages reside in the special construction and combination of the various elements constituting the invention, reference being had to the accompanying drawings forming a part hereof, wherein:—

Figure 1 is a front elevational view of the complete calendar showing the cover sheet arranged on top of the record sheets.

Figure 2 is a rear elevational view illustrating the manner in which the back of the calendar may be utilized for containing various information pertinent to the poultry business.

Figure 3 is a view in side elevation, and,

Figure 4 is an elevational view of one of the record sheets.

Referring now to the drawings in detail, I provide a calendar base member 5 which may be formed of cardboard or other relatively stiff material and of any desirable size, one face of which at its lower portion being provided with the usual calendar pad 6 and its upper portion thereof provided with a pad of poultry record sheets 7, corresponding in number to the number of sheets in the calendar pad so that a record sheet is provided for each month of the calendar.

As more clearly illustrated in Figure 4, the poultry record sheets are ruled in suitable columns, one column indicated at 8 being adapted for recording the sale of eggs, another column 9 being devoted to a record of feed expenses, and an additional column as indicated at 10 being arranged to enable a daily record to be kept of the number of eggs gathered. Provision at the bottom of each of the columns is made for totaling the same and figuring the net gain or loss for the business during a particular month. Near the lower edge of the record sheet the particular month of the sheet is indicated as shown at 11.

A cover sheet 12 is provided for the record sheets, the cover sheet and the record sheets being secured to the base along the top edge thereof as a unit. The face of the cover sheet may be utilized for advertising purposes as indicated at 13.

The cover sheet 12 is formed of an increased length over the record sheet 7 and the lower end thereof is turned under as indicated in Figure 3, whereby to form a pocket 14 at the rear of the cover sheet. The edges of the end of the cover sheet forming the pocket is secured in position at the rear of the cover sheet by means of paper fasteners 15. The lower side edges of each of the record sheets 7 are cut away to a suitable extent as shown at 16 enabling the lower ends of the record sheet to be inserted within the pocket as the record indicated thereon is completed so as to bring the record sheet for the next succeeding month into position. In this manner, the record sheets which have been completed are retained in the pockets in an out of the way position and may thus be available for reference from time to time as desired.

As illustrated in Figure 2 of the drawing, the back of the portion 5 may be utilized for printing various information of benefit for anyone engaged in the raising of poultry.

It will be readily appreciated that the provision of the record sheet enables a poultry raiser to keep an accurate and detailed record of the expenses of his business as well as the amount of sales resulting through the conduct thereof and to determine from month to month the extent of his profits or losses.

It is obvious that the invention is susceptible of various changes and modifications, without departing from the spirit or scope of the invention as hereinafter claimed or sacrificing any of its advantages, and I accordingly claim all such forms of the device to which I am entitled.

I claim:—

1. In an article of the class described, a base member, a pad of poultry record sheets secured along one edge to said base member and corresponding in number to the calendar months and being consecutively marked in accordance therewith, each of said poultry record sheets being ruled to provide separate columns upon which to record the sale of poultry products, the expense thereof, the daily record of eggs produced and to enable totals of such records to be made, whereby to determine the extent of profits or losses during a particular month, said column for the daily record of eggs produced corresponding with the days of the current month of the calendar in order to record the data in chronological order and a cover sheet for the poultry record sheet having a pocket formed therein and adapted to have the free edge of each of the sheets inserted therein whereby to afford access to the next succeeding record sheet.

2. In an article of the class described, a base member, a pad of poultry record sheets secured along their upper edges thereto and corresponding in number to the calendar months and marked and arranged in order corresponding thereto, each of said record sheets being ruled in vertical columns, enabling a record to be kept of the sale of poultry products, of expenses, and a daily record of the eggs produced to enable totals thereof to be recorded whereby to determine the profits or losses of the particular month, said column for the daily record of eggs produced corresponding to the days of the current month of the calendar, a cover sheet for the poultry record sheets, a pocket formed along the lower edge of said cover sheet opening at the back thereof, and formed by folding the lower edge of the cover sheet upwardly and securing the edges thereof in folded position, said pocket being adapted to receive the lower free end of each of the poultry record sheets as the record thereon is completed, whereby to enable the same to be kept in attached relation for future reference.

In testimony whereof I affix my signature.

WESLEY GEORGE KOHL.